United States Patent [19]
Lee et al.

[11] Patent Number: 5,844,240
[45] Date of Patent: Dec. 1, 1998

[54] INFRARED SENSING DEVICE AND METHOD

[75] Inventors: Don-Hee Lee, Kyungki-do; Hak-Su Kim, Seoul, both of Rep. of Korea

[73] Assignee: LG Electronics Inc., Seoul, Rep. of Korea

[21] Appl. No.: 679,075

[22] Filed: Jul. 12, 1996

[51] Int. Cl.[6] ........................................................ G01J 5/08
[52] U.S. Cl. ...................................... 250/342; 250/DIG. 1
[58] Field of Search ................................. 250/DIG. 1, 342

[56] References Cited

U.S. PATENT DOCUMENTS

| | | | |
|---|---|---|---|
| 3,717,763 | 2/1973 | Tanaka et al. | 250/363.02 |
| 5,555,512 | 9/1996 | Imai et al. | 364/550 |
| 5,567,942 | 10/1996 | Lee et al. | 250/353 |

FOREIGN PATENT DOCUMENTS 64-88392  4/1989  Japan .................................. 250/DIG. 1

Primary Examiner—Constantine Hannaher
Attorney, Agent, or Firm—Loeb & Loeb LLP

[57] ABSTRACT

An infrared sensing device includes a condensing lens for gathering an infrared ray from a human body, a guide unit for dividing a room to be monitored into a plurality of lateral and vertical zones and for guiding the infrared ray to a part of an infrared sensor unit corresponding to its direction, a housing for enclosing the condensing lens and guide unit to preclude dispersion of the incident infrared ray, an infrared sensor unit for sensing an infrared ray of a certain zone or infrared rays of a plurality of zones guided by the guide unit and housing, and a signal processing unit for amplifying an output signal of the infrared sensor unit, and for converting the applied signal into a digital signal and analyzing the digital signal.

28 Claims, 13 Drawing Sheets

FIG.7

INFRARED SENSING DEVICE AND METHOD

BACKGROUND OF THE INVENTION

1. Field of the Invention

The present invention relates to an infrared sensing device and method, and more particularly, to an infrared sensing device and method for sensing body movement. Although the present invention is applicable to a wide range of bodies and their movements, it is particularly applicable to living bodies including especially humans.

2. Discussion of the Related Art

Infrared sensing devices are classified into pyroelectric infrared sensing devices and quantum infrared sensing devices. Even though the pyroelectric sensing devices have an inferior detection sensitivity as compared to that of quantum ones, they have low production cost and are relatively simple to manufacture. This is because pyroelectric sensing devices employ a non-cooling system this is driven at ordinary room temperatures. Hence, the pyroelectric sensing devices are coming into a wider use in anti-crime and disaster-preventive apparatus and air-conditioning systems. When a sensing device made of a pyroelectric substance receives an infrared ray emitted from a heat source, such as a human body, the temperature of the pyroelectric substance changes. The temperature change generates a flow of pyroelectricity according to the corresponding change in polarization of the pyroelectric substance to sense the heat source. In recent years, such materials as $PbTiO_3$, lead zirconate titanate, $LiTaO_3$, and polyvinylidene fluoride polymer have been used as pyroelectric materials.

The following description concerns a conventional infrared sensing device referring to the accompanying drawings.

FIG. 1 is a sectional view of a conventional infrared sensing device, and FIG. 2 graphically illustrates temperature-polarization characteristics of a general infrared sensing device. FIG. 3 depicts an equivalent circuit diagram of the conventional infrared sensing device.

A conventional infrared sensing device includes a pyroelectric or ferroelectric chip 1, an infrared detector element mounted on an upperter 2, a gate resistance 4 and a field effect transistor 5 mounted on a circuit substrate 3 under the pyroelectric chip, a filter 6 formed over the pyroelectric chip 1, and a metal package 7 to form a seal.

The more the temperature of the ferroelectric substance of the infrared sensing device increases, the more the polarization of the infrared sensing device decreases, as shown in FIG. 2. The polarization of the pyroelectric sensing device comes up to $P_1$ at a temperature of $T_1$, and dipoles, having positive and negative charges are generated in proportion to the polarization. At this point, when the temperature rises to a point $T_2$, the polarization of the pyroelectric sensing device decreases to $P_2$, and the number of dipoles decreases by $P_2$, whereby the negative and positive charges equivalent to the number of the dipoles by $P_1 - P_2$ ($\Delta P$: decrement of polarization) pass through a metal line. Such negative and positive charges form a flow of pyroelectric current, and the sensing device detects the temperatures corresponding to the change in the flow of pyroelectricity.

Referring to FIG. 3, as the temperature rises to $T_2$ from $T_1$, the polarization of the pyroelectric or ferroelectric chip 1 decreases to $P_2$ from $P_1$, which decreases the number of dipoles and generation of the positive and negative charges by the decrement of the dipoles. The pyroelectric current is transformed to an impedance value by the gate resistance 4 to be applied to a gate the FET 5, and FET 5 sensitively reacts to generate a sensor detection signal.

Moreover, although such a conventional infrared sensing device is capable of sensing the presence of a human body and amount of activity, it cannot detect the location and direction of movement or the distance between the subject body and the device.

SUMMARY OF THE INVENTION

Accordingly, the present invention is directed to a infrared sensing device and related method that substantially obviates one or more of the problems due to limitations and disadvantages of the related art.

An object of the present invention is to provide an infrared sensing device and method for detecting body movements and the amount of body movement activity.

A further object of the present invention is to provide an infrared sensing device and method for detecting the location and direction of the body movement.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a sensing device for sensing infrared ray from a subject in an area having a plurality of zones comprises a housing; a lens in the housing, the lens focusing the infrared ray from the subject located at one of the plurality of zones in the area; a sensor unit for receiving the infrared ray and outputting a sensed signal; a guide unit adjacent to the lens, the guide directing the infrared ray to the sensor unit corresponding to an incident direction of the infrared ray; and a signal processor coupled to the sensor and receiving the sensed signal, the signal processor determining where the subject is located from the sensed signal and producing a corresponding output signal.

In another aspect, the present invention provides a method for sensing an infrared ray using a sensor from a subject located in one of a plurality of zones of an area, the method comprising the steps of focusing the infrared ray from the subject located at the one of the plurality of zones in the area; directing the infrared ray to the sensor corresponding to an incident direction of the infrared ray; detecting the infrared ray and producing a sensed signal; and processing the sensed signal and determining where the subject is located from the sensed signal and producing a corresponding output signal.

In another aspect, the present invention provides a method for sensing a plurality of infrared rays using a sensor from a plurality of subjects located in at least one of a plurality of zones of an area, the method comprising the steps of focusing the infrared rays from the subjects located at the at least one of the plurality of zones in the area; directing the infrared rays to the sensor corresponding to incident directions of the infrared rays; detecting the infrared rays and producing sensed signals; and processing the sensed signals and determining a number of subjects in a zone and where the subjects are located from the sensed signals and producing corresponding output signals.

In another aspect, the present invention provides a method for sensing electromagnetic radiation from a subject using a sensor having a guide, the method comprising the steps of receiving the electromagnetic radiation from a subject; guiding the received electromagnetic radiation to the sensor through the guide corresponding to an incident direction of the radiation; sensing the electromagnetic radiation from a plurality of zones and outputting a corresponding sensed signal; and processing the corresponding signal and determining where the subject is located from the sensed signal and producing an output signal.

In another aspect, the present invention provides a method for sensing an infrared ray emitted from a subject using an infrared sensing device, the method comprising the steps of detecting an incident infrared ray from one of left, right, and central zones of an area divided into a plurality of lateral and vertical zones; determining an amount of activity from the subject; and determining a location of the subject relative to the infrared sensing device.

In a further aspect, the present invention provides an infrared sensing device including a condensing lens for gathering an infrared ray from a human body; a guide unit for dividing a room to be monitored into a plurality of lateral and vertical zone and for guiding the infrared ray to a part of an infrared sensor unit corresponding to its direction; a housing for enclosing the condensing lens and guide unit to preclude dispersion of the incident infrared ray; the infrared sensor unit for sensing an infrared ray of a certain zone or infrared rays of a plurality of zones guided by the guide unit and housing; and a signal processing unit for amplifying an output signal of the infrared sensor unit, and for converting the applied signal into a digital signal and analyzing the digital signal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 7 illustrates a horizontal-sectional view of the infrared sensing device in accordance with the present invention;

DETAILED DESCRIPTION OF THE PREFERRED EMBODIMENTS

Reference will now be made in detail to the preferred embodiments of the present invention, examples of which are illustrated in the accompanying drawings.

Figure 1:
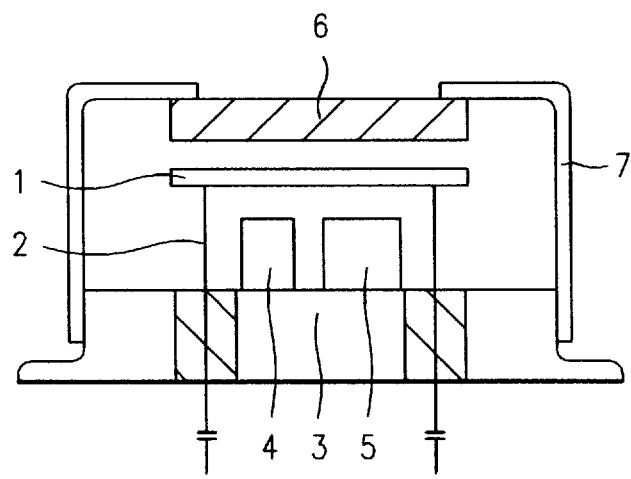
FIG. 1 is a sectional view of a conventional infrared sensing device.
Figure 2:
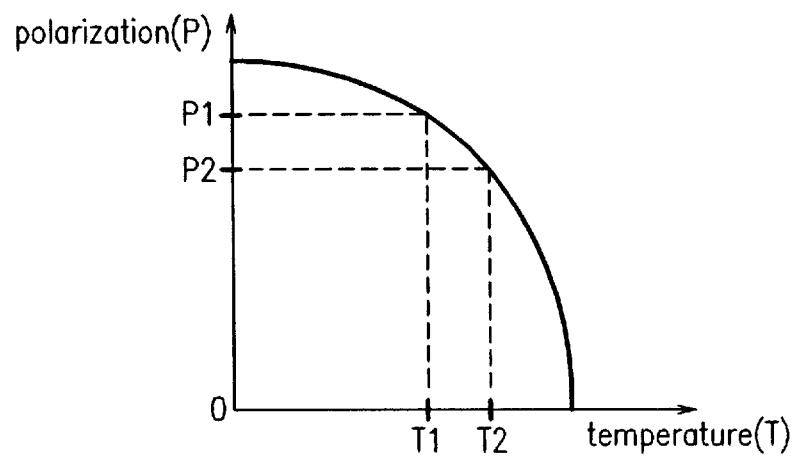
FIG. 2 graphically illustrates temperature-polarization characteristics of a general infrared sensing device.
Figure 3:
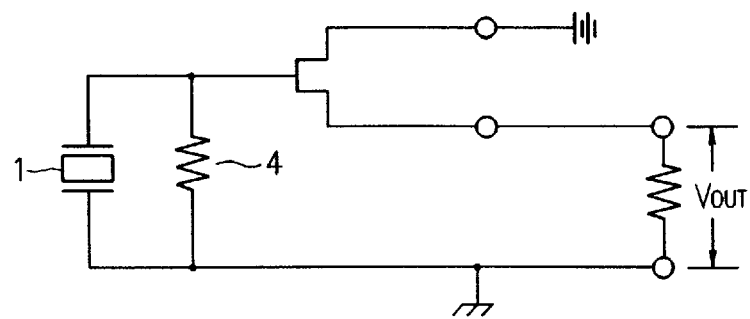
FIG. 3 depicts an equivalent circuit diagram of the conventional infrared sensing device in FIG. 1.
Figure 4:
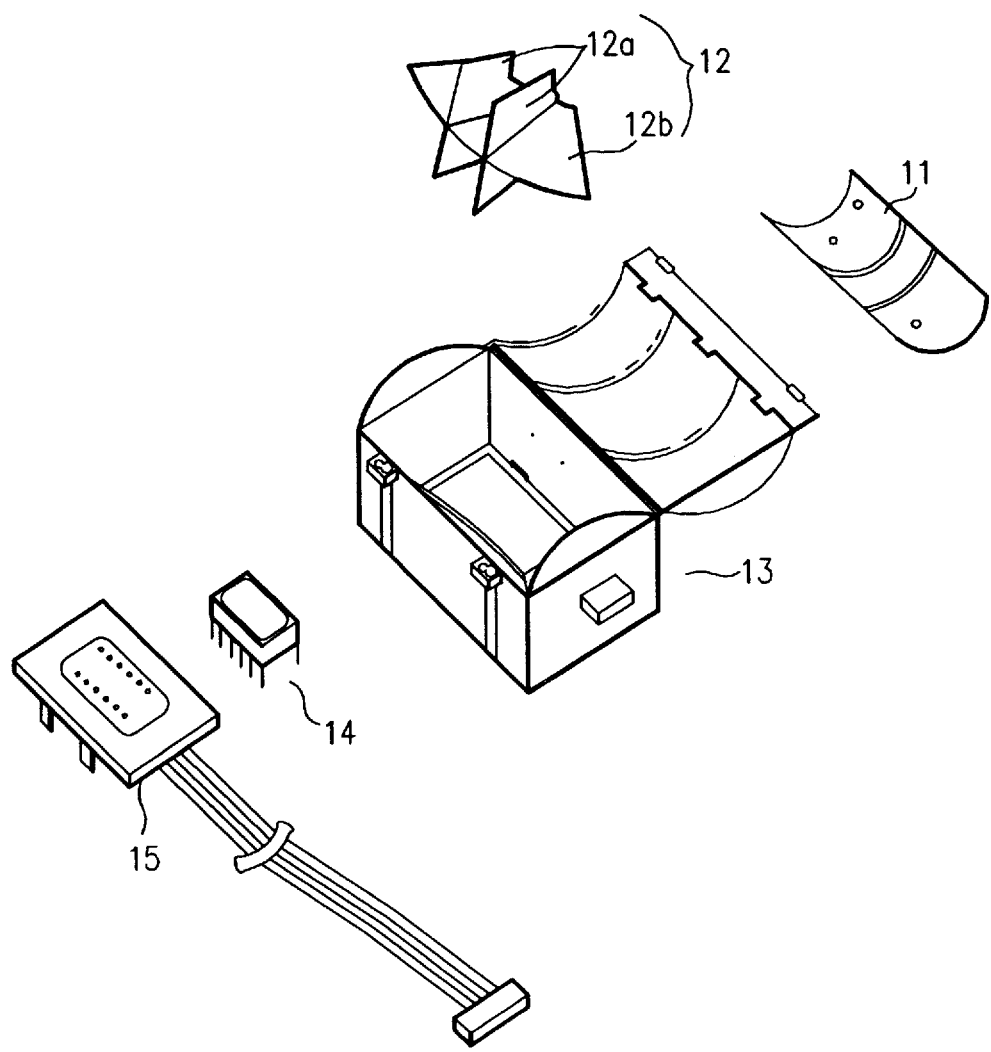
FIG. 4 is an exploded view of an infrared sensing device in accordance with the present invention.
Figure 5:
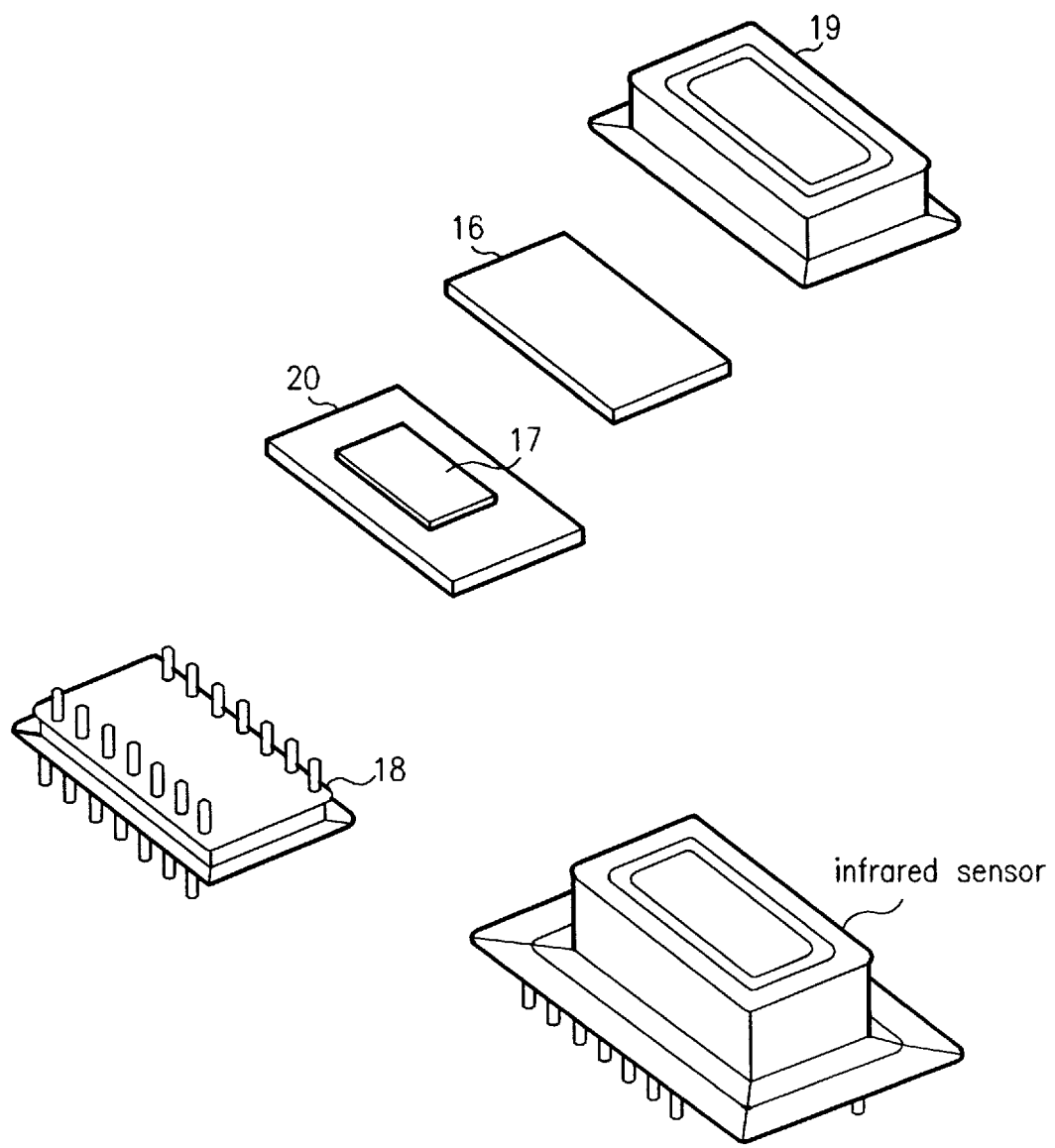
FIG. 5 is an exploded view of the sensor unit in the infrared sensing device in accordance with the present invention.
Figure 6:
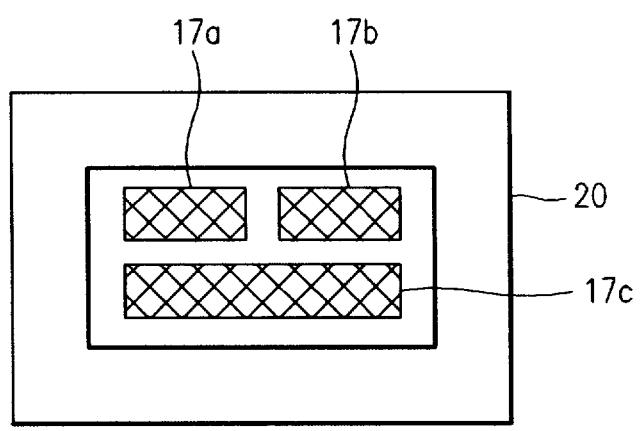
FIG. 6 depicts the structure of an infrared detector unit in accordance with the present invention.
Figure 7:
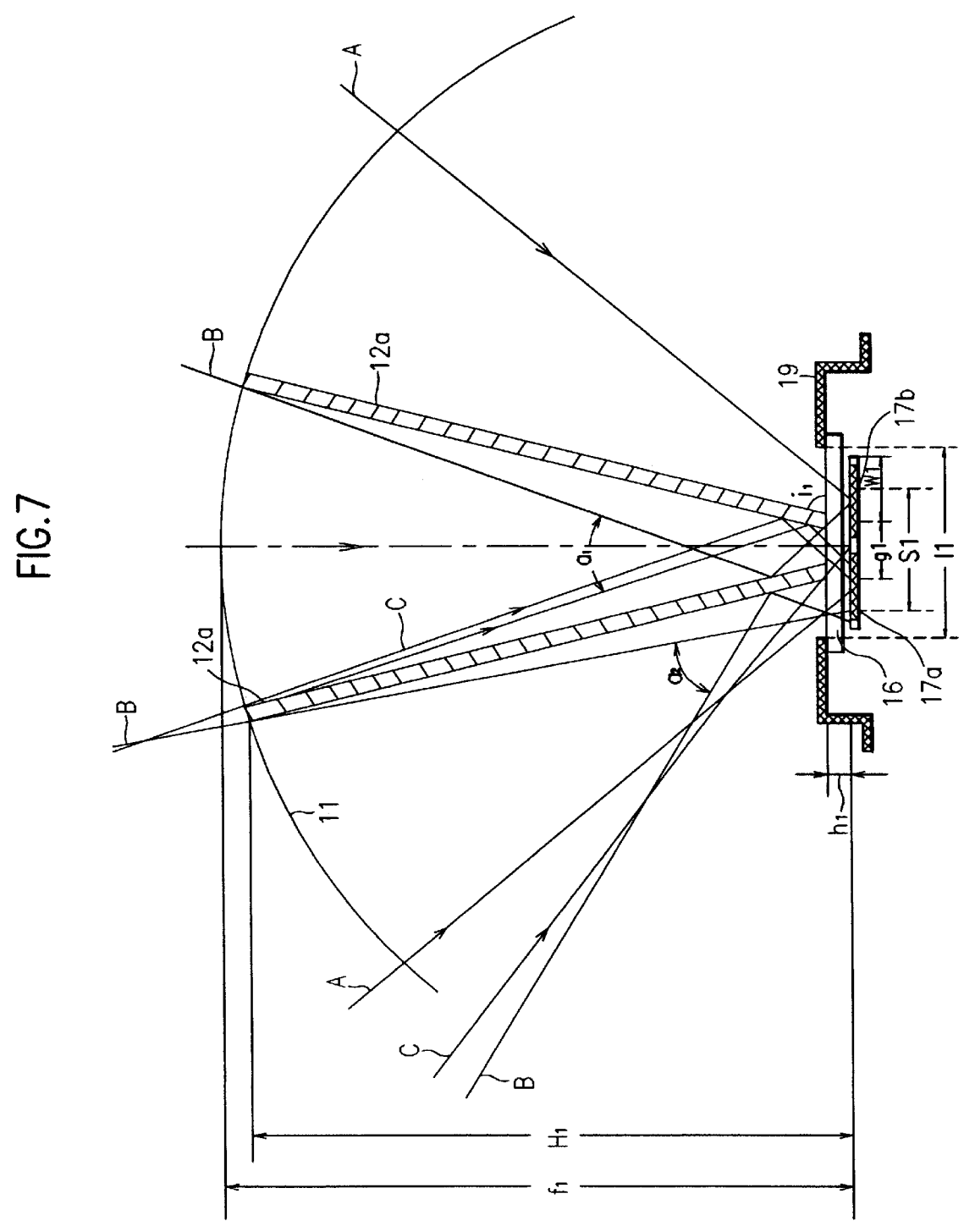
Figure 8:
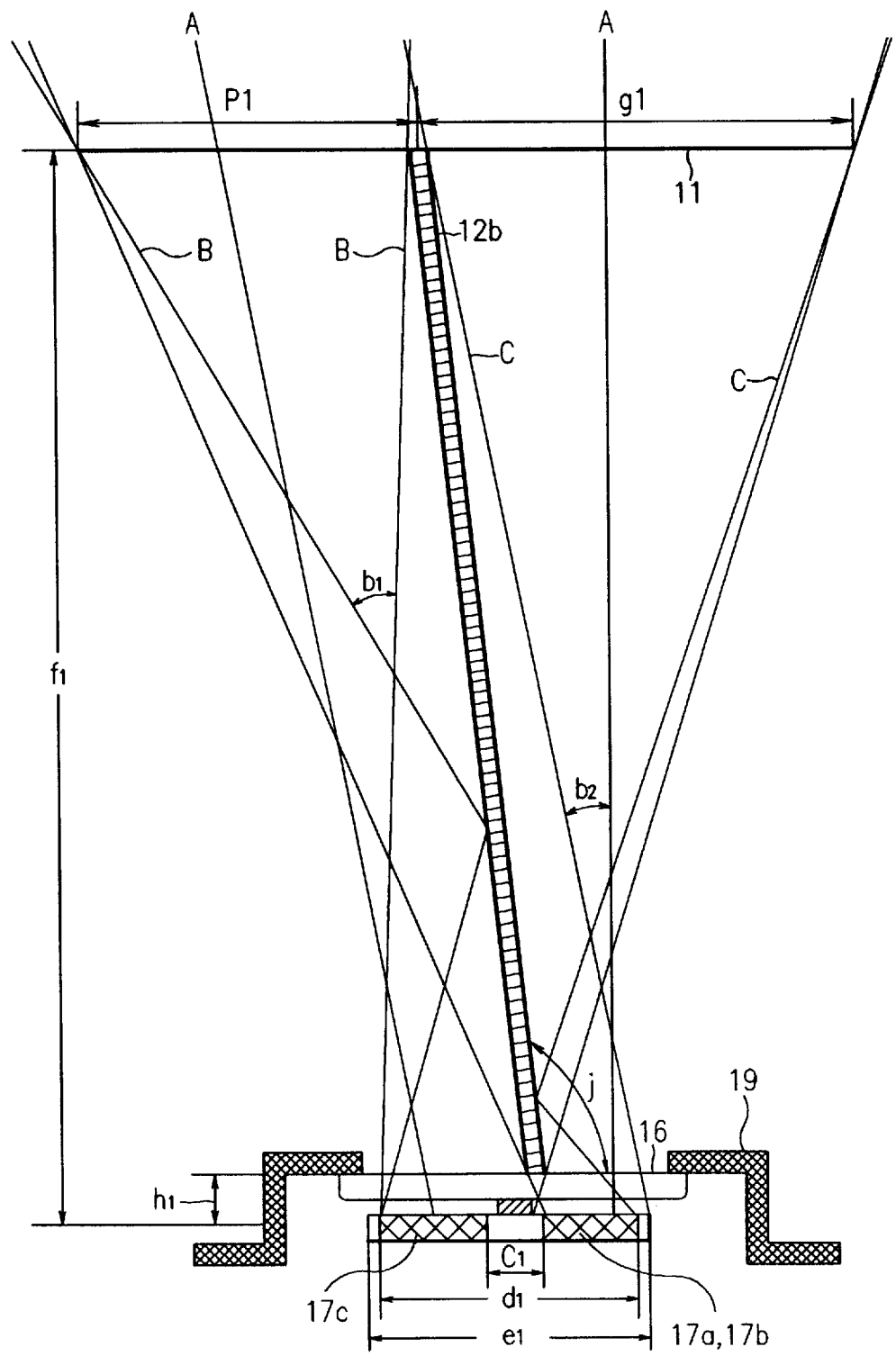
FIG. 8 illustrates a vertical-sectional view of the infrared sensing device in accordance with the present invention.

A preferred embodiment of an infrared sensing device in accordance with the present invention will be described in detail with reference to the drawings. FIGS. 4 and 5 are exploded views of an infrared sensing device and an infrared sensor unit each in accordance with the present invention. FIG. 6 depicts the structure of an infrared detector unit in accordance with the present invention. FIGS. 7 and 8 depict each of horizontal and vertical sectional views of the infrared sensing device in accordance with the present invention.

Referring to FIG. 4, the infrared sensing device includes a fresnel lens 11 for collecting thermal, infrared radiation emitted from a human body for example. A guide unit 12 with horizontal and vertical guides 12b and 12a divides an area or a room to be monitored into a plurality of lateral and vertical zones and guides a certain infrared ray IR emitted from a subject present in one of the zones. A guide housing encloses the guide unit 12 to prevent dispersion of the incident infrared ray via the fresnel lens 11 and guide unit 12. The infrared sensing device of the present invention also includes an infrared sensor unit 14 for sensing the infrared ray guided by the guide unit 12, and a signal processing unit 15 for amplifying a signal produced from the infrared sensor unit 14. The signal processing unit 15 also converts the applied signal to a digital signal and analyzes the digital signal.

Referring now to FIG. 5, the infrared sensor unit 14 includes an infrared filter 16 for filtering only an infrared ray. An infrared detector 17 with an impedance transformer 20 detects the infrared ray received from the infrared filter 16 and produces a pyroelectric current. The infrared detector 17 and impedance transformer 20 are mounted on a metallic stem 18. A metallic package 19 contains the infrared filter 16, the infrared detector 17, and the impedance transformer 20 to form a seal. As shown in FIG. 6, the infrared detector 17 includes the impedance transformer 20 with a field effect transistor FET and a gate resistance formed on the same circuit substrate. Two lateral/long-distance zone detector elements 17a and 17b are mounted on an upper portion of the infrared detector to detect a left, central, or right zone and long-distance zone of a room to be monitored. A short-distance zone detecting element 17c is mounted under the lateral/long-distance zone detector elements 17a and 17b to detect a short-distance zone of the room.

For the position of the detector elements, the lateral/long-distance zone detector elements 17a and 17b are divided into three parts—left, right and central—by two vertical guides 12a, which is depicted in FIGS. 4 and 7.

If a person is present in the central zone, for example the central one of the lateral/long-distance zone detector elements 17a and 17b formed by the vertical guides 12a detects the position of the person, and two lateral/long-distance zone detector elements 17a and 17b together produce a responsive output. The short-distance zone detecting element 17c for monitoring a short-distance zone of a room is disposed under the lateral/long-distance zone detector elements 17a and 17b.

In addition, a horizontal guide 12b is disposed between the lateral/long-distance zone detector elements 17a and 17b and the short-distance zone detector element 17c to prevent a mutual interference in the long- and short-distance zone detection when an infrared ray is incident on the infrared detector 17, as shown in FIG. 8.

The following description concerns the operation of the infrared sensing device in accordance with the present invention.

An infrared ray IR that is emitted from a human body, for example, present in one of the zones divided by the guides 12a and 12b, as mentioned above, is collected by the fresnel lens 11. The ray is then focused either on the lateral/long-distance zone elements 17a and 17b or on the short-distance zone element 17c of the infrared detector 17 corresponding to the zone location of the human body. The infrared ray IR detected through each zone is applied to the impedance transformer 20 of the infrared detector 17 to generate a sensor detection signal.

Accordingly, if a human body is present and/or if anyone moves in a certain zone, the corresponding infrared detector elements of the zone produce an output to sense the location and/or direction of movement of anyone present, the amount of activity in the zones, etc. Each infrared detector element's sequential reaction to the direction and speed of movement of a human body provides information on the direction of movement to the infrared sensing device. The infrared sensing device senses the amount of activity from the frequency of reaction of each infrared detector element in response to the frequency of the body movement.

Detection angles to left, central, and right zones are defined as shown in FIGS. 7 and 8, and lateral/long-distance zone detector elements 17a and 17b have left, central, and right parts by the vertical guides 12a.

At incidence angle A, infrared rays from the respective left, central, and right zones are incident on the corresponding parts of the lateral/long-distance zone detector elements 17a and 17b. Incidence angle B is indicative of maximal degrees of a curve in an infrared ray that comes from the central, left, or right zone and can be incident on the central part of the detector elements. Incidence angle C is indicative of the direction of an infrared ray incident on an infrared detector element of the zone adjacent to the corresponding zone's infrared detector element.

The range of a detection angle is defined by an incident infrared ray. Central detection angle a1 is determined by $H_1$, $f_1$, $i_1$, $h_1$, $w_1$ and $g_1$ shown in the drawing. Left detection angle $a_2$ is defined by $H_1$, $f_1$, $i_1$, $g_1$, $s_1$ and $l_1$. Since the infrared sensing device of the present invention is symmetrical, right detection angle $a_3$ is expressed using the same principle as that of the left detection angle. The reference letters designate the following: $H_1$ represents a height of the upper end of each vertical guide 12a; $f_1$ represents a focal length of the fresnel lens 11; $i_1$ represents an angle at which the vertical guides 12a are disposed; $h_1$ represents a height of the lower end of each vertical guide 12a; $w_1$ represents a width of the lateral/long-distance zone detector elements 17a and 17b; $g_1$ represents an interval between two vertical guides 12a; $g_1$ represents an interval between two vertical guides 12a; $l_1$ represents a width of the infrared filter 16 window; and $s_1$ represents $2g_1-w_1$.

An erroneous operation of the lateral/long-distance detector elements 17a and 17b that is generally caused by an incident ray in another zone is also invited by an incident infrared ray longer than the focal length $f_1$ of the fresnel lens 11. This problem can be prevented by comparing an output of the lateral long-distance detector elements 17a and 17b with a reference voltage by the signal processing unit 15 and not taking account of its result, since the intensity of infrared radiation is not high.

The horizontal guide 12b disposed between the lateral/long-distance detector elements 17a and 17b and short-distance zone detector element 17c can provide information on whether a human body is far from or near the infrared sensing device of the present invention.

Short-distance detection angle $b_1$ of the lower part is defined by $f_1$, $j_1$, $g_1$, $c_1$, $d_1$ and $h_1$, and long-distance detection angle $b_2$ of the lower part is defined by $f_1$, $j_1$, $p_1$, $c_1$, $d_1$ and $h_1$.

The reference letters are defined as the following: $j_1$ represents an angle at which the horizontal guide 12b is installed on the infrared sensing device; $c_1$ represents an interval between the lateral/long-distance detector elements 17a and 17b and short-distance detector element 17c; $d_1$ represents $2\times w_1$(a width of the lateral/long-distance detector elements)—$c_1$; $e_1$ represents a width of the infrared filter 16 window; $p_1$ represents a width in length of the fresnel lens 11 lower part; and $g_1$ represents a width in length of the fresnel lens 11 upper part.

Figure 9:
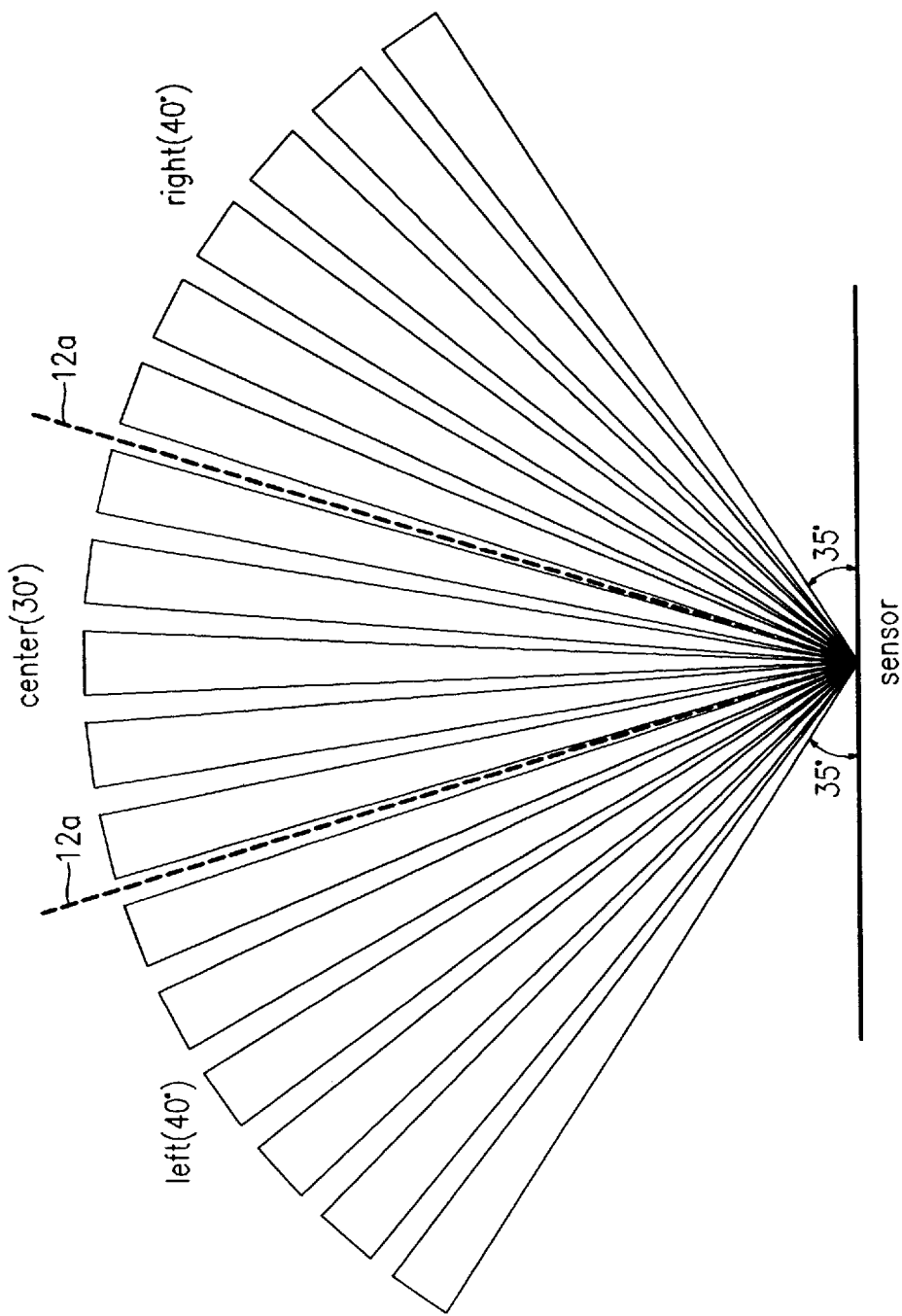
FIG. 9 illustrates a horizontal distribution of the infrared sensing device's field of view in accordance with the present invention.
Figure 10:
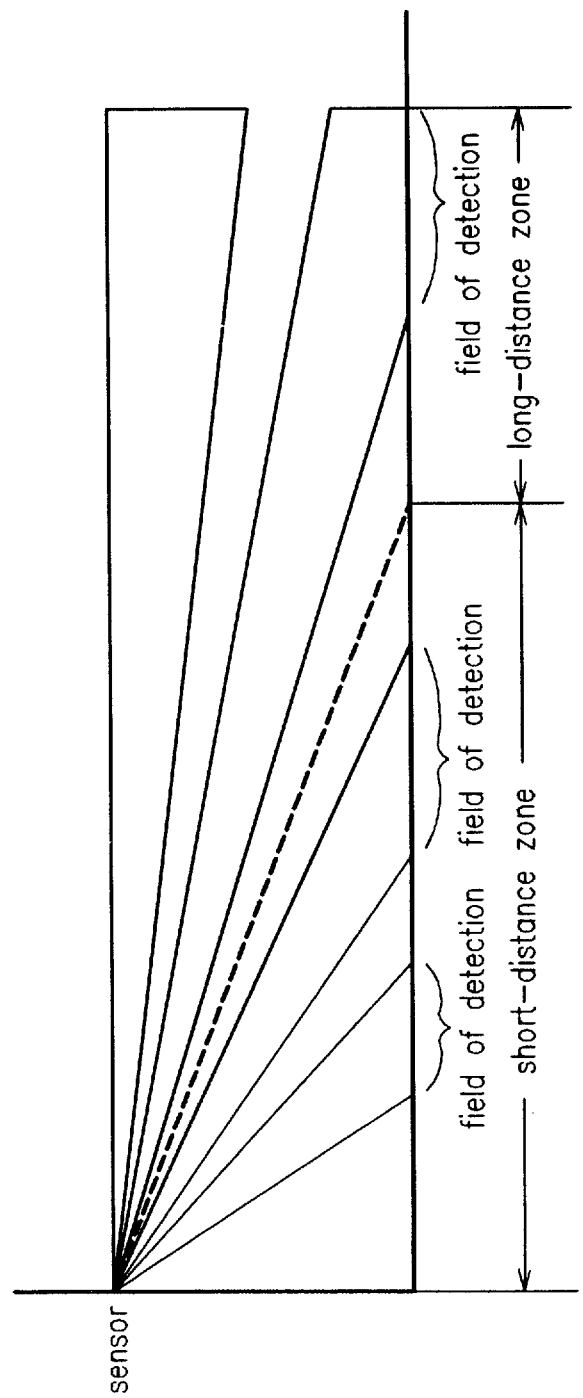
FIG. 10 illustrates a vertical distribution of the inventive infrared sensing device's field of view in accordance with the present invention.
Figure 11:
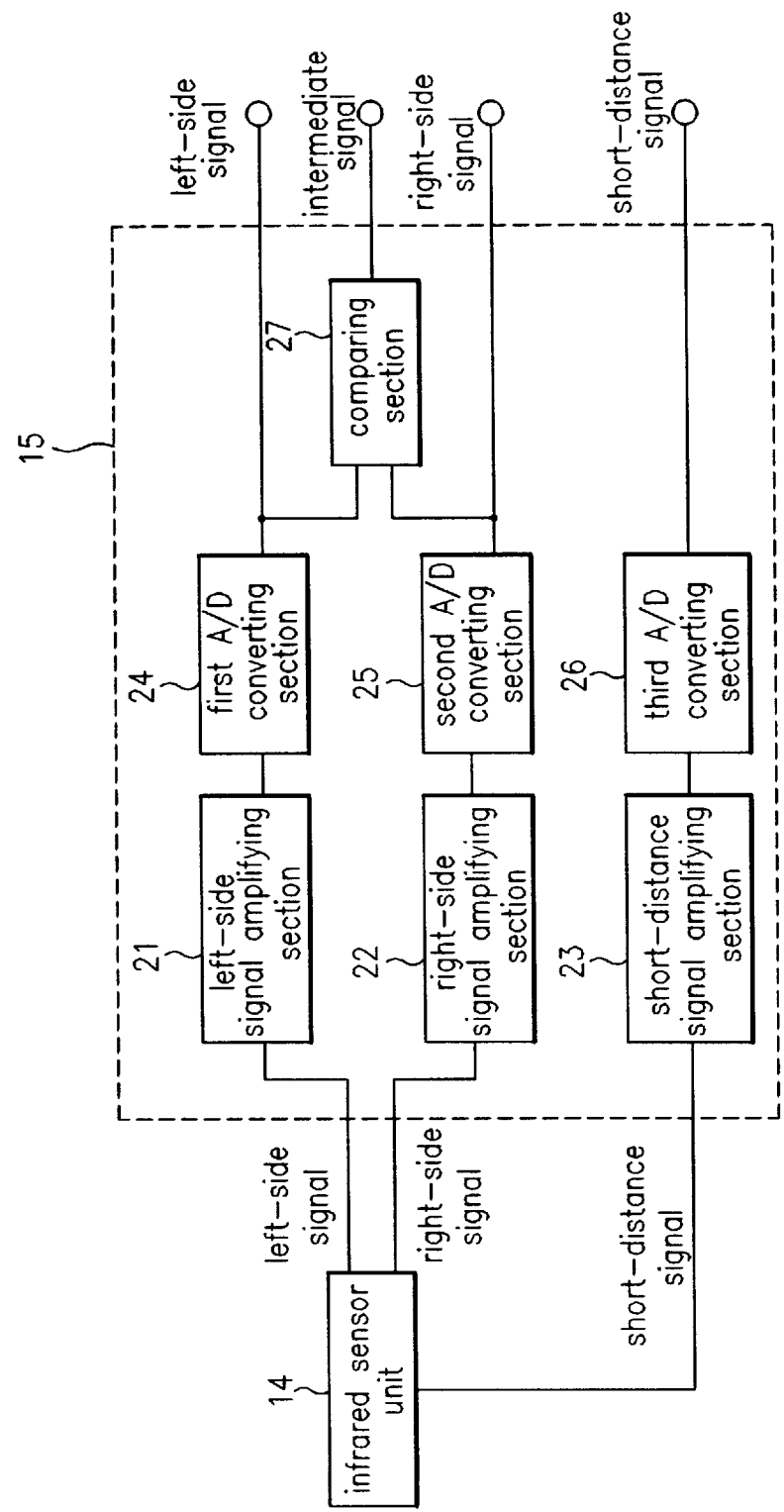
FIG. 11 is a block diagram of the infrared sensing device in accordance with the present invention.

FIG. 9 depicts a horizontal distribution of the infrared sensing device's field of view, and FIG. 10 depicts a vertical distribution of the infrared sensing device's field of view in the present invention. FIG. 11 is a block diagram of the infrared sensing device in accordance with the present invention, and FIG. 12 is a circuit diagram of the infrared sensing device in accordance with the present invention.

As shown in FIG. 11, the sensing device of the present invention includes an infrared sensor unit 14 and a signal processing unit 15. The infrared sensor unit 14 senses each infrared ray coming from a plurality of the zones and produces a left-side signal, right-side signal or short-distance signal.

The signal processing unit 15 has a left-side signal amplifying section 21 that receives a left-side signal produced from the infrared sensor unit 14 and increases the amplitude of the applied signal. A right-side signal amplifying section 22 receives a right-side signal produced from the infrared sensor unit 14 and increases the amplitude of the applied signal. A short-distance signal amplifying section 23 receives the short-distance signal of the infrared sensor unit 14 and increases the amplitude of the applied signal. The signal processing unit 15 also has first, second and third A/D converting sections 24, 25 and 26 each receiving the respective output signals produced from the left-side signal, right-side signal and short-distance signal amplifying sections 21, 22 and 23, respectively. The first, second and third A/D converting sections convert the applied signals to digital signals, respectively. A comparing section 27 receives the left-side and right-side signals from the first and second A/D converting sections 24 and 25, compares them to each other, computes the applied signals, and then produces an intermediate signal.

Figure 12:
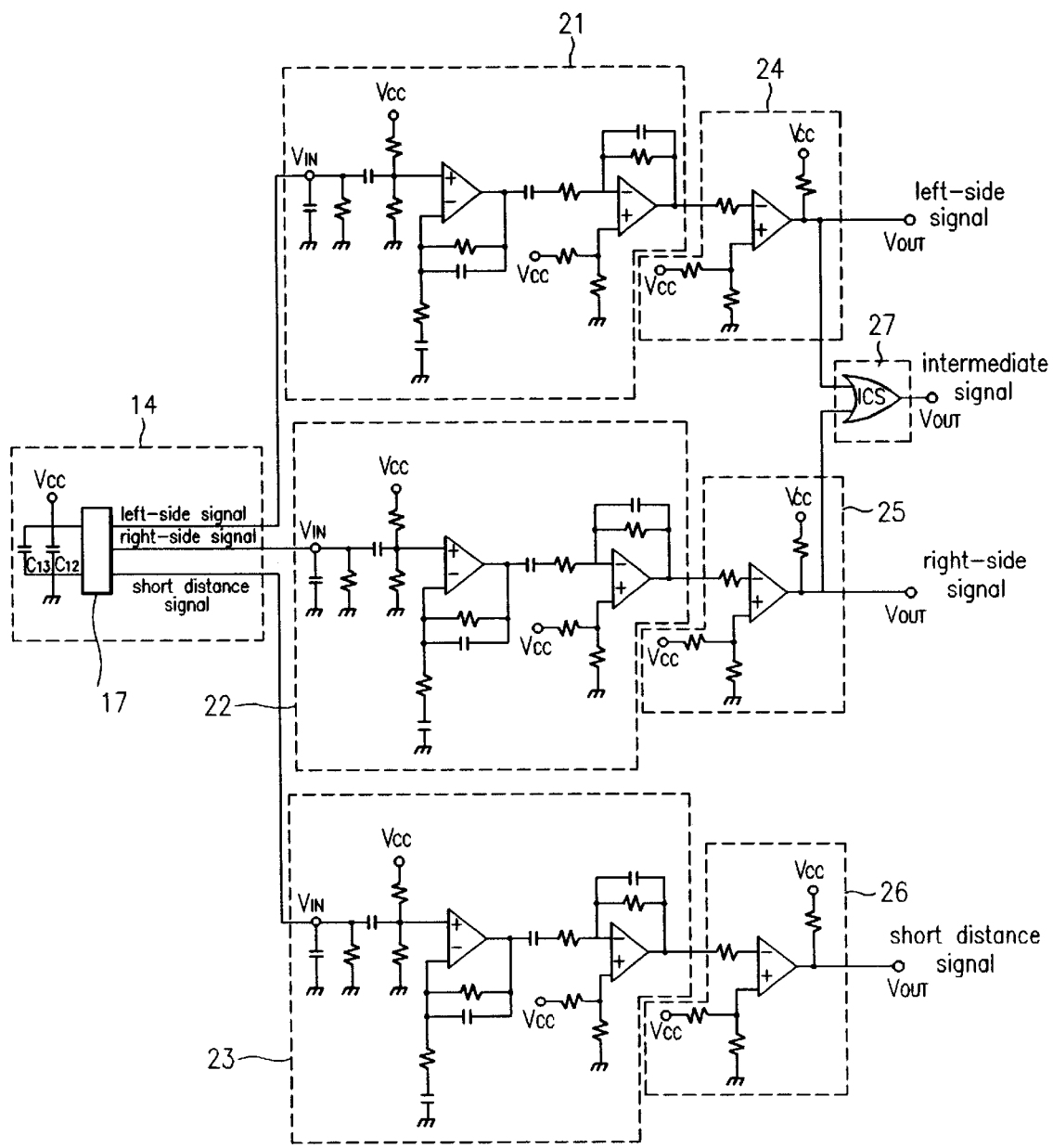
FIG. 12 is a circuit diagram of the infrared sensing device of FIG. 11 in accordance with the present invention.

As shown in FIG. 12, the sensing device of the present invention includes the infrared sensor unit 14 having power supply Vcc, ground, capacitors $C_{12}$ and $C_{13}$ each coupled in parallel between the power supply Vcc and ground to remove a noise at the supply voltage. An infrared detector 17 driven by the power supply Vcc produces the left-side, right-side and or short-distance signal. The signal processing unit 15 including the left-side signal, right-side signal, and short-distance signal amplifying sections 21, 22 and 23 each having non-inverting and inverting amplifiers coupled to each other, the amplitude is determined by each resistance and capacitor connected to the amplifiers. The signal processing unit 15 also includes the first, second and third A/D converting sections 24, 25 and 26 that convert each respective amplified signal from the amplifying sections into a digital one by using comparators. The comparing section 27 compares the right-side and left-side signals with each other by using comparing gates.

The following description explains the operation of the infrared sensing device in accordance with the present invention.

If a human body is present at a left portion or zone of a room that the infrared sensing device is monitoring, an infrared ray emitted from the human body becomes incident on the left one of the lateral/long-distance zone detector elements 17a and 17b of the infrared detector 17 (see FIGS. 6 and 7) by the vertical guides 12a that divides the room into left, central and right zones.

A left-side signal is produced by the infrared ray incident on the left one of the lateral/long-distance zone detector elements 17a and 17b, and its amplitude is increased through the left-side signal amplifying section 21. The amplified signal is converted into a digital signal by the first A/D converting section 24 which produces a signal that conveys information that the human body is present in the left zone.

When the sensor unit 14 senses the presence of the human body, its high-level output signal attains a low level, and the cycle or period of this low-level signal varies with the intensity of the infrared ray incident on the detector element. In other words, when the human body is near the infrared sensing device, the intensity of the infrared ray emitted from the human body is high, and the low-level signal's period becomes long. On the contrary, if the human body is far from the infrared sensing device, the intensity of the infrared ray is low, and the low-level signal period becomes short.

The operation for the right-side and short-distance signals are similar to that of the left-side signal explained above.

An infrared ray produced from the central zone is led by the vertical guides 12a and is incident on the central one of the lateral/long-distance zone detector elements 17a and 17b that is electrically connected to left and right parts of the detector elements to generate left-side and right-side signals at the same time. These left-side and right-side signals are amplified through the non-inverting and inverting amplifiers of the left-side and right-side signal amplifying sections 21 and 22. The amplified signals are converted into digital signals by the first and second A/D converting sections 24 and 25.

The two digital signals are compared with a reference voltage by the comparing section 27, and if each of the two signals attains a low level, a response signal informing that the human body is in the central zone is produced.

The following description explains the steps involved in the detection of a human body by the infrared sensing device of the present invention.

Figure 13A:
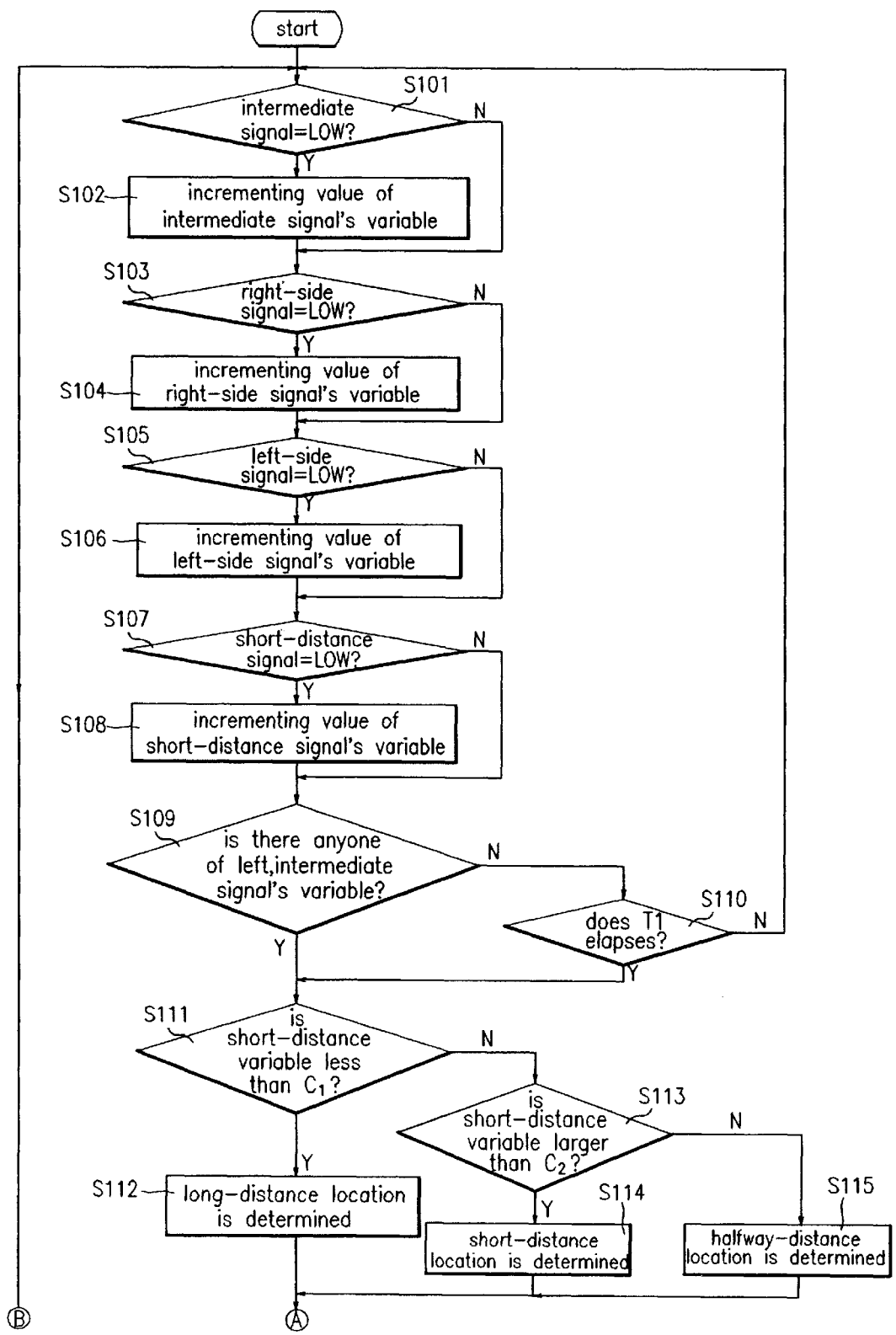
FIGS. 13A and 13B illustrate flowcharts showing a method for sensing a human body by the infrared sensing device in accordance with the present invention.
Figure 13B:
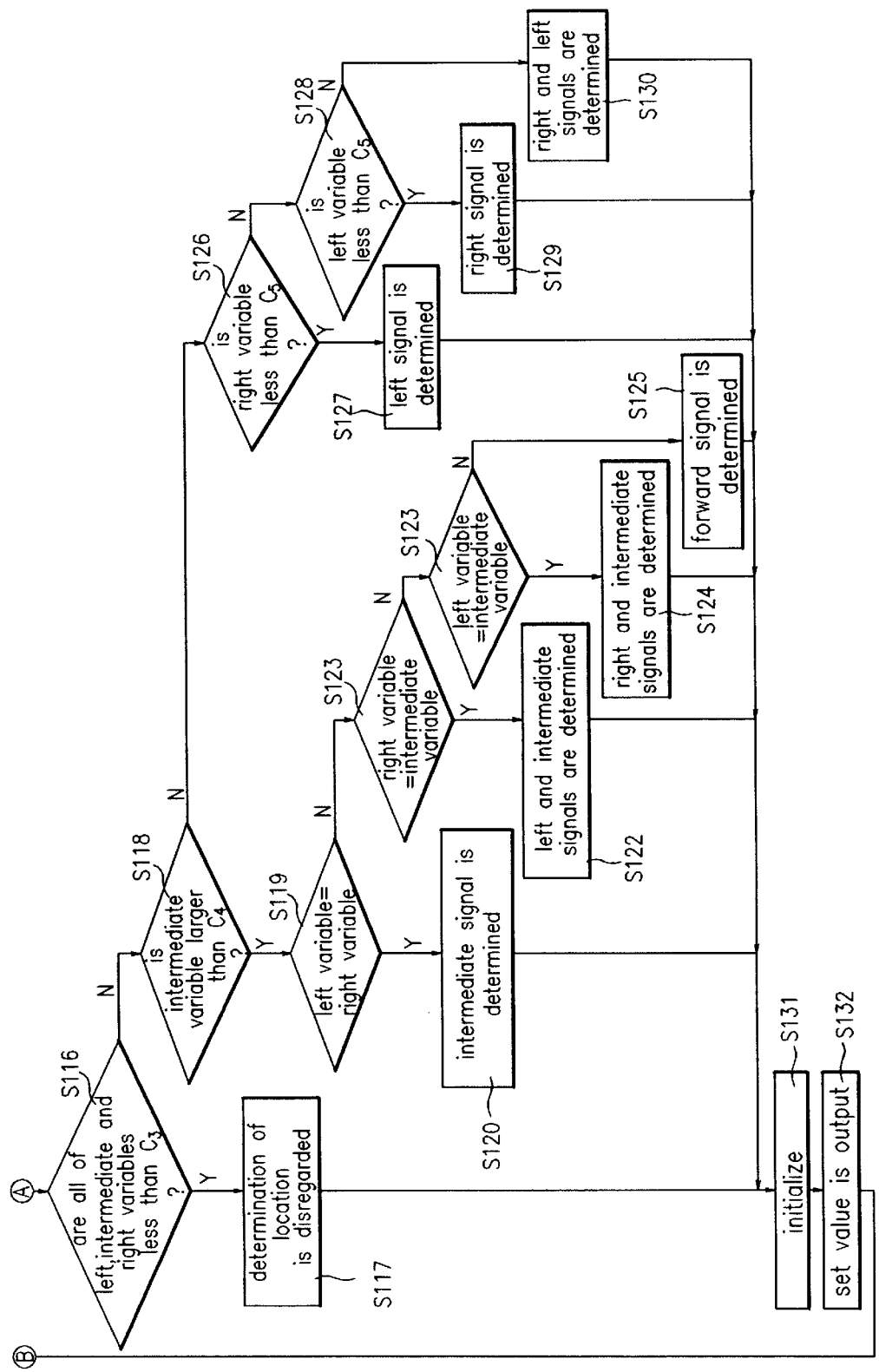

Referring to FIGS. 13A and 13B, if a human body is present in front of the infrared sensing device, the infrared sensing device checks respective left-side, intermediate, right-side and short-distance signals. In other words, the sensing device determines (S101) whether the intermediate signal is at a low level. If the intermediate signal is at a low level, the sensing device increments a value of the intermediate signal variable or counter (S102). If the intermediate signal is at a high level, the sensing device determines (S103) whether the right-side signal next to the intermediate signal is at a low level. If the right-side signal is at a low level, the sensing device increments a value of the right-side signal variable or counter (S104). If the right-side signal is at a high level, the sensing device determines (S105) whether the next left-side signal is at a low level. If the left-side signal is at a low level, the sensing device increments a value of the left-side signal variable or counter (S106). If the left-side signal is at a high level, the sensing device determines (S107) whether the short-distance signal is at a low level. If the short-distance signal is at a low level, the sensing device increments a value of the short-distance signal variable or counter (S108). If the short-distance signal is at a high level, the sensing device proceeds to the next step.

After the above step, if any one of the left, intermediate, and right variables exceeds a first set value $X_1$, it indicates that the amount of human body activity is great, and the sensing device proceeds to the next step (S109). If all of the left, intermediate, and right variables do not exceed the first set value $X_1$, the sensing device determines whether a predetermined period of time T1 has elapsed. If the predetermined period of time T1 has elapsed by, the sensing device starts the next step, and if not, the sensing device returns (S110) to the initial step (S101).

Subsequently, the sensing device of the present invention determines (S111) whether the short-distance variable is less than a second set value $C_1$. If the short-distance variable is less than the second set value $C_1$, it indicates that the human body is far from the infrared sensing device, and the sensing device determines (S112) that the human body is located at a long-distance.

If the short-distance variable exceeds (or equals) the second set value $C_1$, the sensing device determines (S113) whether the short-distance variable exceeds a third set value $C_2$. The human body is determined to be near the infrared sensing device if the short-distance variable exceeds the third set value $C_2$, and the sensing device determines (S114) that the human body is located at a short-distance. Further, if the short-distance variable is larger than (or equal to) the second set value C1 but less than the third set value C2, the sensing device determines that the human body is Icoated at an intermediate distance or at a halfway-distance, and proceeds to the next step (S115).

After the above step, if all of the left, intermediate, and right variables are less than a fourth set value $C_3$ (S116), the sensing device disregards the location, and proceeds (S117) to the initializing step (S131).

If anyone of the left, intermediate, and right variables exceeds (or equal) the fourth set value $C_3$, the sensing device determines (S118) whether the intermediate variable exceeds a fifth set value $C_4$ If the intermediate variable exceeds a fifth set value $C_4$, the sensing device determines (119) whether the right variable is equal to the left variable. If the right variable is equal to the left variable, the intermediate signal is determined, and the sensing device proceeds (S120) to the initializing step (S131).

If the right variable is not equal to the left variable, the sensing device determines (S121) whether the right variable is equal to the intermediate variable. If the right variable is equal to the intermediate variable, the left-side and intermediate signals are determined, and the sensing device proceeds (S122) to the initializing step (S131). If the right variable is not equal to the intermediate variable, the sensing device determines (S123) whether the left variable is equal to the intermediate variable. If the left variable is equal to the intermediate variable, the right-side and intermediate signals are determined, and the sensing device proceeds (S124) to the initializing step (S131). If the left variable is not equal to the intermediate variable, a forward signal is determined and the sensing device proceeds (S125) to the initializing step (S131).

When the sensing device determines (S118) whether the intermediate variable exceeds the fifth set value $C_4$, if the intermediate variable does not exceed the fifth set value $C_4$, the sensing device determines (S126) whether the right variable is less than a sixth set value $C_5$. If the right variable is less than the sixth set value $C_5$, the left-side signal is determined, and the sensing device proceeds (S127) to the initializing step (S131).

If the right variable exceeds (or equals) the sixth set value $C_5$, the sensing device determines (S128) whether the left variable is less than the sixth set value $C_5$. If the left variable is less than the sixth set value $C_5$, the right-side signal is determined, and the sensing device proceeds (S129) to the initializing step (S131). If the left variable exceeds (or equals) the sixth set value $C_5$, the left-side and right-side signals are determined, and the sensing device proceeds (S130) to the initializing step (S131).

After the above steps, all variables are initialized at S131, and the sensing device generates an output as a set value, and returns (S132) to the initial step.

If the routine of detecting a short-distance signal (the steps of determining a short- or long-distance location in the short-distance signal amplifying section 23 and third A/D converting section 26 of FIGS. 11 and 12 and the steps S111–S115 of FIG. 13A) is deleted from the inventive detecting method of the present invention, the infrared sensing device of the present invention can detect a short- or long-distance location of anyone present by the intensity of each left, central, and right infrared ray incident on the lateral/long-distance detector elements 17a and 17b. In other words, if a human body is far from the sensing device, the intensity of the infrared ray incident on the detector elements becomes low, and the applied low-level signal period is reduced to decrease the respective counting values of the left, intermediate, and right variables to the low-level signal. On the contrary, if a human body is near the sensing device, each counting is increased.

Accordingly, there may be an application of the following algorithm: if the respective counting values of the left-side, intermediate, and right-side signals exceed a number $X_2$, the infrared sensing device determines the location of a human body to be at a short-distance, and if the counting values are less than a number $X_3$ that is smaller than $X_2$, the device determines the location to be long-distance. Moreover, if the counting value exceed the smaller number $X_3$, the device determines the location to be halfway-distance.

According to the infrared sensing device and method for detecting a human body of the present invention, the presence of a human body, the location and direction of movement of anyone present in an area can be detected. In this regard, when the present invention is applied to an air-conditioning system, for example, the air-conditioning system directs a flow of cool air to the zone where a human body is present to perform an automatic air-circulation control effectively.

The present invention also has advantages of low power consumption, simplification in manufacture, lightweight and small size, and low production cost. This is because the sensor unit of the present invention includes only a fresnel lens, guides, and infrared detector elements designed by high optical technology.

The present invention provides an infrared sensing device having three pyroelectric infrared sensor elements and guide unit dividing a room to be monitored into long-distance and short-distance zones and right, central, and left zones to sense the location and direction of movement anyone present, the presence of a human body and amount of activity, and to further provide a method of sensing a human body by such a sensing device.

It will be apparent to those skilled in the art that various modifications and variations can be made in the infrared sensing device and sensing method of the present invention without departing from the spirit or scope of the invention. Thus, it is intended that the present invention covers the modifications and variations of this invention provided they come within the scope of the appended claims and their equivalents.

What is claimed is:

1. A sensing device for sensing infrared ray from a subject in an area having a plurality of zones, the sensing device comprising:
    a housing;
    a lens in the housing, the lens focusing the infrared ray from the subject located at one of the plurality of zones in the area;
    a sensor unit for receiving the infrared ray and outputting a sensed signal, the sensing unit including an infrared detector having detecting elements corresponding to the plurality of zones, the detecting elements including:
        a first detecting element for detecting a first zone.
        a second detecting element for detecting a second zone, a combination of the first and second detecting elements detecting a third zone, and
        a third detecting element detecting a distance from the sensor device to the subject, wherein the first, second, and third detecting elements cover the area having the plurality of zones including the first, second, and third zones:
    a guide unit adjacent to the lens, the guide unit directing the infrared ray to the sensor unit corresponding to an incident direction of the infrared ray; and
    a signal processor coupled to the sensor unit and receiving the sensed signal, the signal processor determining where the subject is located from the sensed signal and producing a corresponding output signal.

2. The sensing device according to claim 1, wherein the lens includes a fresnel lens.

3. The sensing device according to claim 1, wherein the first zone includes a left zone, the second zone includes a right zone, and the third zone includes a central zone.

4. The sensing device according to claim 1, wherein the signal processor includes:
    an amplifying unit coupled to the sensor unit and amplifying signals produced from the first and second detecting elements, respectively;
    an analog to digital converter coupled to the amplifying unit and converting the amplified signals to digital signals.

5. The sensing device according to claim 4, wherein the signal processor further includes a comparator for comparing the digital signals from the analog to digital converter corresponding to the first and second detecting elements to produce an intermediate signal corresponding to the third zone.

6. The sensing device according to claim 1, wherein the third detecting element and at least one of the first and second detecting elements are combined to detect a fourth zone.

7. The sensing device according to claim 6, wherein the first zone includes a left zone, the second zone includes a right zone, the third zone includes a central zone.

8. The sensing device according to claim 6, wherein the fourth zone is divided into a first subzone and a second subzone, the first subzone being closer to the sensor unit than the second subzone.

9. The sensing device according to claim 6, wherein the signal processor includes:
an amplifying unit coupled to the sensor unit and amplifying signals produced from the first, second, and third detecting elements, respectively;
an analog to digital converter coupled to the amplifying unit and converting the amplified signals to digital signals.

10. The sensing device according to claim 9, wherein the signal processor further includes a comparator for comparing the digital signals from the analog to digital converter corresponding to the first and second detecting elements to produce an intermediate signal corresponding to the third zone.

11. The sensing device according to claim 1, wherein the sensor unit further includes:
an infrared filter for passing an infrared ray;
a support member for supporting the infrared detector; and
a package for protecting the infrared filter, the infrared detector, and the support member from external environments
wherein the infrared detector senses the infrared ray passed through the infrared filter and generates pyroelectricity.

12. The sensing device according to claim 11, wherein the sensor unit further includes an impedance transformer having the detecting elements on the transformer, the transformer being divided into multiple portions corresponding to the plurality of zones.

13. The sensing device according to claim 11, wherein
the first and second detector elements sense an infrared ray emitted from the plurality of zones including a left zone, a right zone, a central zone, and a first distance zone; and
the third detector element senses an infrared ray emitted from a second distance zone.

14. The sensing device according to claim 1, wherein the guide unit divides the area into the plurality of zones.

15. The sensing device according to claim 14, wherein the guide unit includes:
a first guide section for dividing the area into a plurality of zones including left, right and central zones; and
a second guide section for dividing the area into a plurality of zones including short distance and long distance zones relative to the sensor unit.

16. The sensing device according to claim 15, wherein the first guide and the second guide sections intersect with each other.

17. The sensing device according to claim 1, wherein the guide unit has a fan shape.

18. The sensing device according to claim 1, wherein the first element has a first size, the second element has a second size, and the third element has a third size, the first and second sizes having substantially same size and the third size being substantially equal to a sum of the first and second sizes.

19. A method for sensing an infrared ray using a sensor from a subject in an area having a plurality of zones, the method comprising the steps of:

focusing the infrared ray from the subject located at one of the plurality of zones in the area;
directing the infrared ray to the sensor corresponding to an incident direction of the infrared ray;
detecting the infrared ray using at least first and second detecting elements for detecting first and second zones, respectively, and producing a sensed signal, the detecting step including the steps of:
combining the first and second elements to detect a third zone, and
using a third detecting element for detecting a distance from the sensor to the subject, wherein the first, second, and third detecting elements cover the area having the plurality of zones; and
processing the sensed signal and determining where the subject is located from the sensed signal and producing a corresponding output signal.

20. The method according to claim 19, wherein the step of detecting infrared ray includes the step of detecting whether the infrared ray is emitted from one of the plurality of zones including left, right and central zones.

21. The method according to claim 20, wherein the step of detecting infrared ray includes the step of detecting whether the infrared ray is emitted from one of the plurality of zones including a first distance zone and a second distance zone.

22. A method for sensing a plurality of infrared rays using a sensor from a plurality of subjects located in an area having a plurality of zones, the method comprising the steps of:
focusing the infrared rays from the subjects located in at least one of the plurality of zones;
directing the infrared rays to the sensor corresponding to incident directions of the infrared rays;
detecting the infrared rays using at least first and second detecting elements for detecting first and second zones, respectively, and producing sensed signals, the detecting step including the steps of:
combining the first and second detecting elements to detect a third zone, and
using a third detecting element for detecting distances from the sensor to the subjects, wherein the first, second, and third detecting elements cover the area having the plurality of zones; and
processing the sensed signals and determining a number of subjects in a zone and where the subjects are located from the sensed signals and producing corresponding output signals.

23. The method according to claim 22, wherein the step of detecting infrared rays includes that step of detecting whether the infrared rays are emitted from left, right and central zones.

24. The method according to claim 22, wherein the step of detecting infrared rays includes that step of detecting whether the infrared rays are emitted from a first distance zone and a second distance zone.

25. A method for sensing electromagnetic radiation from a subject in an area having a plurality of zones using a sensor having a guide, the method comprising the steps of:
receiving the electromagnetic radiation from a subject;
guiding the received electromagnetic radiation to the sensor through the guide corresponding to an incident direction of the radiation;
sensing the electromagnetic radiation using at least first and second detecting elements for detecting first and second zones, respectively, and outputting a corresponding sensed signal, the sensing step including the steps of:

combining the first and second elements to detect a third zone, and using a third detecting element for detecting a distance from the sensor to the subject, wherein the first, second, and third detecting elements cover the area having the plurality of zones; and processing the corresponding signal and determining where the subject is located from the sensed signal and producing an output signal.

26. A method for sensing an infrared ray emitted from a subject using an infrared sensing device, the method comprising the steps of:

detecting an incident infrared ray from one of left, right, and central zones of an area divided into a plurality of zones using at least first and second detecting elements for detecting the left and right zones, respectively, the detecting step including the steps of:

combining the first and second elements to detect the central zone, and using a third detecting element for detecting a distance from the sensor to the subject, wherein the first, second, and third detecting elements cover the area divided into the plurality of zones;

determining an amount of activity from the subject; and determining a location of the subject relative to the infrared sensing device.

27. The method according to claim 26, wherein the step of detecting the incident infrared ray detects a relative distance from which the infrared ray was emitted.

28. The method according to claim 27, wherein the step of detecting the relative distance includes the step of determining an intensity of the infrared ray.

\* \* \* \* \*

UNITED STATES PATENT AND TRADEMARK OFFICE
CERTIFICATE OF CORRECTION

PATENT NO. : 5,844,240
DATED : December 1, 1998
INVENTOR(S) : Don-Hee Lee, Hak-Su Kim It is certified that error appears in the above-identified patent and that said Letters Patent is hereby corrected as shown below:

On the title page, item [30] Foreign Application Data should read--Korea 20672 July 13, 1995-- .

Signed and Sealed this

Twenty-third Day of March, 1999

Attest:

Q. TODD DICKINSON

Attesting Officer

Acting Commissioner of Patents and Trademarks